United States Patent
Li

(10) Patent No.: US 10,645,184 B2
(45) Date of Patent: May 5, 2020

(54) INFORMATION TRANSMISSION METHOD, GATEWAY, AND CONTROLLER

(71) Applicant: Huawei Technologies Co., Ltd., Shenzhen (CN)

(72) Inventor: Fei Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 16/110,604

(22) Filed: Aug. 23, 2018

(65) Prior Publication Data

US 2018/0367635 A1    Dec. 20, 2018

Related U.S. Application Data

(63) Continuation of application No. PCT/CN2017/072906, filed on Feb. 4, 2017.

(30) Foreign Application Priority Data

Feb. 23, 2016 (CN) .......................... 2016 1 0100041

(51) Int. Cl.
*H04L 29/08* (2006.01)
*H04L 29/06* (2006.01)
(Continued)

(52) U.S. Cl.
CPC .......... *H04L 67/2828* (2013.01); *H04L 12/66* (2013.01); *H04L 69/04* (2013.01); *H04L 69/24* (2013.01); *H04L 12/2854* (2013.01)

(58) Field of Classification Search
CPC ...... H04L 12/66; H04L 67/2828; H04L 69/04
See application file for complete search history.

(56) References Cited

U.S. PATENT DOCUMENTS

2002/0082840 A1    6/2002   Kim et al.
2003/0158968 A1    8/2003   Huart et al.
(Continued)

FOREIGN PATENT DOCUMENTS

CN      1496651 A       5/2004
CN    101014173 A       8/2007
(Continued)

OTHER PUBLICATIONS

Machine Translation and Abstract of Chinese Publication No. CN101014173, Aug. 8, 2007, 21 pages.
(Continued)

*Primary Examiner* — Ayaz R Sheikh
*Assistant Examiner* — Debebe A Asefa
(74) *Attorney, Agent, or Firm* — Conley Rose, P.C.

(57) ABSTRACT

An information transmission method, a gateway, and a controller relate to the communications field, and to determine a compression parameter according to an operating status and a transmission port of the gateway, thereby implementing an optimal combination of processor performance and bandwidth. The method includes that a gateway determines a current operating status and a current transmission port of the gateway, where the current transmission port is a current communications port between the gateway and a controller, the gateway determines a first compression parameter table according to the current operating status and the current transmission port, where the first compression parameter table includes at least one compression parameter determined by the gateway, and the first compression parameter table further indicates a priority of each compression parameter, the gateway transmits information to the controller according to the first compression parameter table using the current transmission port.

20 Claims, 5 Drawing Sheets

(51) Int. Cl.
*H04L 12/66* (2006.01)
*H04L 12/28* (2006.01)

(56) References Cited

U.S. PATENT DOCUMENTS

| | | | |
|---|---|---|---|
| 2005/0008023 | A1 | 1/2005 | Melhorn |
| 2009/0207773 | A1 | 8/2009 | Feng et al. |
| 2011/0234829 | A1 | 9/2011 | Gagvani et al. |
| 2013/0077486 | A1* | 3/2013 | Keith ............... H04L 47/2433 370/230.1 |
| 2014/0098115 | A1 | 4/2014 | Ju et al. |
| 2015/0003476 | A1 | 1/2015 | Zhang et al. |
| 2015/0370488 | A1* | 12/2015 | Watanabe ............... G06F 12/04 711/103 |

FOREIGN PATENT DOCUMENTS

| | | |
|---|---|---|
| CN | 101035086 A | 9/2007 |
| CN | 101197824 A | 6/2008 |
| CN | 101459616 A | 6/2009 |
| CN | 103166983 A | 6/2013 |
| CN | 103260187 A | 8/2013 |

OTHER PUBLICATIONS

Machine Translation and Abstract of Chinese Publication No. CN101459616, Jun. 17, 2009, 14 pages.
Deutsch, P., et al, "ZLIB Compressed Data Format Specification version 3.3.," RFC 1950, May 1996, 9 pages.
Deutsch, P., "DEFLATE Compressed Data Format Specification version 1.3.," RFC 1951, May 1996, 15 pages.
Ylonen, T., et al, "The Secure Shell (SSH) Protocol Architecture," RFC 4251, Jan. 2006, 30 pages.
Ylonen, T., et al, "The Secure Shell (SSH) Authentication Protocol," RFC 4252, Jan. 2006, 17 pages.
Ylonen, T., et al, "The Secure Shell (SSH) Transport Layer Protocol," RFC 4253, Jan. 2006, 32 pages.
Ylonen, T., et al, "The Secure Shell (SSH) Connection Protocol," RFC 4254, Jan. 2006, 24 pages.
Foreign Communication From A Counterpart Application, PCT Application No. PCT/CN2017/072906, English Translation of International Search Report dated Apr. 5, 2017, 2 pages.
Foreign Communication From A Counterpart Application, PCT Application No. PCT/CN2017/072906, English Translation of Written Opinion dated Apr. 5, 2017, 5 pages.
Machine Translation and Abstract of Chinese Publication No. CN101035086, Sep. 12, 2007, 16 pages.
Machine Translation and Abstract of Chinese Publication No. CN101197824, Jun. 11, 2008, 11 pages.
Machine Translation and Abstract of Chinese Publication No. CN103166983, Jun. 19, 2013, 21 pages.
Foreign Communication From A Counterpart Application, Chinese Application No. 201610100041.7, Chinese Office Action dated Jun. 5, 2019, 9 pages.
Foreign Communication From A Counterpart Application, European Application No. 17755733.7, Extended European Search Report dated Jan. 7, 2019, 7 pages.

* cited by examiner

INFORMATION TRANSMISSION METHOD, GATEWAY, AND CONTROLLER

CROSS-REFERENCE TO RELATED APPLICATIONS

This application is a continuation of International Patent Application No. PCT/CN2017/072906 filed on Feb. 4, 2017, which claims priority to Chinese Patent Application No. 201610100041.7 filed on Feb. 23, 2016. The disclosures of the aforementioned applications are hereby incorporated by reference in their entireties.

TECHNICAL FIELD

The present disclosure relates to the field of computer technologies, and in particular, to an information transmission method, a gateway, and a controller.

BACKGROUND

Currently, in many application scenarios, a user terminal may access a wide area network (WAN) using a gateway, and a system administrator may use a controller to manage a large quantity of gateways.

The gateway accesses the controller using the WAN, and the controller and the gateway may transmit control information according to the Network Configuration Protocol (NETCONF). An Extensible Markup Language (XML) is used in the NETCONF to encapsulate the control information. Content in an XML encoded message (which is referred to as an XML message) is easy to read, and a peer end can parse the control information in the XML message without referring to other information. However, because the XML message includes a relatively large amount of control information, transmission efficiency is relatively low when the control information is transmitted using the XML message. Therefore, during transmission of the XML message, the XML message is compressed to improve information transmission efficiency and save transmission bandwidth. Meanwhile, compression of the XML message increases load on a processor, and increases a processing time.

In addition, in a current solution, a compression method is determined by negotiation when a connection for information transmission is established to the peer end, and does not change after the connection is established. A same compression parameter is used to compress the XML message each time before the XML message is transmitted to the peer end, and consequently central processing unit (CPU) processing load is relatively heavy, and a processing time is increased. Alternatively, no compression is performed during transmission of the XML message, and this causes over occupation of bandwidth.

SUMMARY

The present disclosure provides an information transmission method, a gateway, and a controller in order to flexibly adjust a compression parameter according to an operating status and a transmission port, and provides a dynamic compression solution in order to implement an optimal combination of processor performance and bandwidth.

To achieve the foregoing objectives, the following technical solutions are used in embodiments of the present disclosure.

According to a first aspect, an information transmission method is disclosed, including determining, by a gateway, a current operating status and a current transmission port of the gateway, where the current transmission port is a current communications port between the gateway and a controller, and determining a current operating status is determining whether the gateway is currently in an initial startup synchronization state or a normal management operating state, determining, by the gateway, at least one compression parameter according to the current operating status and the current transmission port, where the at least one compression parameter includes a preferentially used compression parameter, a secondly used compression parameter, and the like, and determining a first compression parameter table according to the at least one compression parameter, where the first compression parameter table includes the at least one compression parameter, and the first compression parameter table further indicates a priority of each compression parameter, a sequence of compression parameters in the first compression parameter table indicates priorities of the compression parameters, for example, if four compression parameters A, B, C, and D are included, it represents that A is a compression parameter of the highest priority, and the gateway preferentially uses A, and transmitting, by the gateway, information to the controller according to the first compression parameter table using the current transmission port. Further, compression processing may be performed on the information according to the first compression parameter table. The compression processing herein is different from that in the other approaches in which one compression parameter negotiated with the controller is always used to perform compression processing on the information. It may be all possible to process the information according to a compression parameter in the first compression table, or to process the information according to a compression parameter supported by the controller, or not to process data. This depends on the current operating status and the current transmission port.

In the other approaches, a compression algorithm is determined when the gateway and the controller establish a connection, and after the connection is established, the compression algorithm is not changed until a compression parameter is negotiated when another connection is established. During this period, a same compression parameter is used in information transmission between the gateway and the controller, to compress information. Consequently, CPU processing load is always relatively heavy, and a processing time of the gateway is increased. Alternatively, no compression is performed during information transmission, and this causes over occupation of bandwidth and wastes bandwidth.

In the present disclosure, after the current operating status and transmission port change, the gateway determines a compression parameter table according to the current operating status and the current transmission port, and then performs compression processing on the information according to the compression parameter table. That is, the gateway can flexibly adapt a compression parameter according to a scenario, and then negotiate, with the controller, a compression parameter adapted to a current scenario. The compression parameter can be flexibly adjusted according to an operating status and a transmission port, a dynamic compression solution is provided, and an optimal combination of processor performance and bandwidth can be implemented. In this way, in information transmission between the gateway and the controller, CPU processing load is not always heavy, and a processing time of the gateway is reduced, in addition, bandwidth is not over occupied, and bandwidth is properly utilized.

With reference to the first aspect, in a first possible implementation of the first aspect, transmitting, by the gateway, information to the controller according to the first compression parameter table using the current transmission port includes sending, by the gateway, the first compression parameter table to the controller, receiving, by the gateway, a response message sent by the controller, where the response message carries a first compression parameter that is determined by the controller according to the first compression parameter table, and the first compression parameter herein may be a compression parameter in the first compression parameter table, or may not be a compression parameter in the first compression parameter table, but is necessarily a compression parameter supported by the controller, and processing, by the gateway, to-be-transmitted information according to the first compression parameter, and sending the processed information to the controller.

In this way, the gateway determines multiple compression parameters according to the current operating status and the current transmission port, and then negotiates with the controller using the foregoing procedure to determine a final compression parameter used for information processing.

With reference to the first aspect or the first possible implementation of the first aspect, in a second possible implementation of the first aspect, determining, by the gateway, a first compression parameter table according to the current operating status and the current transmission port includes, when the current operating status is a normal operating state, determining, by the gateway, a compression parameter of the gateway in an initial operating phase and a first compression parameter table of another transmission port of the gateway, where the other transmission port is a transmission port, other than the current transmission port, in transmission ports of the gateway, and determining, by the gateway, the first compression parameter table according to the compression parameter of the gateway in the initial operating phase and the compression parameter table of the other transmission port such that the first compression parameter table is different from the compression parameter table of the other transmission port, and the first compression parameter table does not include the compression parameter of the gateway in the initial operating phase.

Herein, a reason why the compression parameter in the normal operating state is set to be different from the compression parameter in the initial operating phase is that a processor in an initial state has relatively light processing load, and may use a relatively large compression parameter (for example, a compression ratio of 80%) to fast compress the information such that relatively low bandwidth is occupied during information transmission, and the controller may receive compressed information in a relatively short time. To sum up, processing capabilities of the processor of the gateway in the normal operating state and in the initial operating phase are definitely different, and therefore different compression parameters need to be set.

In addition, the first compression parameter table is set to be different from the compression parameter table of the other transmission port configured for the gateway, that is, it needs to be ensured that compression parameter tables of the transmission ports are different. This rule is applicable to a scenario of a single transmission port, that is, only one transmission port can be used in a single time of information transmission between the gateway and the controller. In this way, after the gateway switches the transmission port, it can still be ensured that a compression parameter table of the current transmission port is different from that of a previous transmission port.

With reference to the first aspect or the first possible implementation of the first aspect, in a third possible implementation of the first aspect, if N transmission ports are currently configured for the gateway, and N is an integer that is greater than or equal to 2, the method further includes switching, by the gateway, the N transmission ports to M transmission ports, and determining M compression parameter tables for the M transmission ports, where all the M compression parameter tables are different from N compression parameter tables of the N transmission ports, and M is an integer that is greater than or equal to 2.

This policy is applicable to a scenario of multiple transmission ports, that is, multiple transmission ports may be used during a single time of information transmission between the gateway and the controller. In this way, after the gateway switches the transmission ports, it can still be ensured that compression parameter tables of the current transmission ports are different from those of previous transmission ports.

With reference to the first possible implementation of the first aspect, in a fourth possible implementation of the first aspect, the first compression parameter is a compression parameter in the first compression parameter table, and is a compression parameter supported by the controller, or the first compression parameter is a compression parameter supported by the controller, but is not a compression parameter in the first compression parameter table.

That is, the first compression parameter determined by the controller according to the first compression parameter table is not necessarily a compression parameter in the first compression parameter table. For example, the first compression parameter table includes a compression parameter 1, a compression parameter 2, and a compression parameter 3, but the controller does not support compression, and then the determined first compression parameter may be a compression parameter 0 (representing that no compression is to be performed).

With reference to any one of the first aspect or the first to the fourth possible implementations of the first aspect, in a fifth possible implementation of the first aspect, the method further includes receiving, by the gateway, a second compression parameter table sent by the controller, where the second compression parameter table includes at least one compression parameter supported by the controller, and the second compression parameter table further indicates a priority of each compression parameter supported by the controller, and determining, by the gateway, a second compression parameter according to the second compression parameter table, and sending the second compression parameter to the controller such that the controller processes, according to the second compression parameter, information to be transmitted to the gateway.

Herein, the controller detects that a scenario changes, proactively triggers a compression policy update, and negotiates a compression parameter with the gateway using the second compression parameter table, and the controller finally processes, according to the compression parameter, the information to be transmitted to the gateway.

With reference to the fifth possible implementation of the first aspect, in a sixth possible implementation of the first aspect, determining, by the gateway, a second compression parameter according to the second compression parameter table includes sequentially determining, by the gateway in descending order of priorities of compression parameters included in the second compression parameter table, whether the gateway supports the compression parameters included in the second compression parameter table, until a compression parameter supported by the gateway is determined, and determining the determined compression parameter supported by the gateway as the second compression parameter.

The compression parameter table indicates priorities of the compression parameters, and therefore the gateway needs to sequentially determine whether the gateway supports the compression parameters included in the second compression parameter table. For example, the second compression parameter table includes a compression parameter 1, a compression parameter 2, and a compression parameter 3. The gateway first needs to determine whether the gateway supports the compression parameter 1, if the gateway does not support the compression parameter 1, the gateway determines whether the gateway supports the compression parameter 2, and if the gateway supports the compression parameter 2, the gateway determines that the second compression parameter is the compression parameter 2. Certainly, if the gateway does not support any compression parameter included in the second compression parameter table, the gateway determines a compression parameter supported by the gateway as the second compression parameter.

With reference to the first aspect, in a seventh possible implementation of the first aspect, before the gateway determines the current operating status and the current transmission port of the gateway, the gateway may further send dynamic compression capability indication information to the controller, where the dynamic compression capability indication information is used to indicate that the gateway supports a dynamic compression rule, and the dynamic compression rule herein is a dynamic compression rule of determining the first compression parameter table according to the current operating status and the current transmission port.

The gateway receives a capability response message sent by the controller, and determines, according to the capability response message, that the controller supports the dynamic compression rule, where the capability response message is used to indicate whether the controller supports the dynamic compression rule.

Certainly, this is merely an optional step, that is, regardless of whether the controller supports the dynamic compression rule, the gateway can determine the compression parameter table according to the local current operating status and the current transmission port.

The dynamic compression capability indication information is a connection establishment message, a local extension message, or a handshake message.

According to a second aspect, an information transmission method is disclosed, including first, receiving, by a controller, a first compression parameter table sent by a gateway, where the first compression parameter table is determined by the gateway according to a current operating status of the gateway and a current transmission port of the gateway, the first compression parameter table includes at least one compression parameter, and the first compression parameter table further indicates a priority of each compression parameter, second, determining, by the controller, a first compression parameter according to the first compression parameter table, and finally, sending, by the controller, a response message to the gateway such that the gateway processes to-be-transmitted information according to the first compression parameter, where the response message carries the first compression parameter, and the to-be-transmitted information is information to be transmitted to the controller by the gateway.

In the present disclosure, after the current operating status and transmission port change, the gateway determines a compression parameter table according to the current operating status and the current transmission port. The controller receives the compression parameter table sent by the gateway, and negotiates a compression parameter with the gateway such that the gateway performs compression processing on the information. That is, the gateway can flexibly adapt a compression parameter according to a scenario, and then negotiate, with the controller, a compression parameter adapted to a current scenario. The compression parameter can be flexibly adjusted according to an operating status and a transmission port, a dynamic compression solution is provided, and an optimal combination of processor performance and bandwidth can be implemented. In this way, in information transmission between the gateway and the controller, CPU processing load is not always heavy, and a processing time of the gateway is reduced. In addition, bandwidth is not over occupied, and bandwidth is properly utilized.

With reference to the second aspect, in a first possible implementation of the second aspect, determining, by the controller, a first compression parameter according to the first compression parameter table further includes sequentially determining, by the controller in descending order of a priority of the at least one compression parameter, whether the controller supports the at least one compression parameter, until a compression parameter supported by the controller is determined, and determining the determined compression parameter supported by the controller as the first compression parameter.

With reference to the second aspect, in a second possible implementation of the second aspect, the method further includes if the controller detects that bandwidth of a control channel of the gateway changes, generating a second compression parameter table according to current bandwidth of the control channel, where the second compression parameter table includes at least one compression parameter supported by the controller, and the second compression parameter table further indicates a priority of each compression parameter supported by the controller, sending, by the controller, the second compression parameter table to the gateway such that the gateway determines a second compression parameter according to the second compression parameter table, and receiving, by the controller, the second compression parameter sent by the gateway, and processing, according to the second compression parameter, information to be transmitted to the gateway.

That is, after detecting that the bandwidth of the control channel of the gateway changes, the controller proactively triggers a compression parameter update, and sends the second compression parameter table to the gateway in order to negotiate a compression parameter, and the controller processes, according to the compression parameter, the information to be transmitted to the gateway. The bandwidth of the control channel is bandwidth for carrying a data service in the NETCONF.

With reference to the second possible implementation of the second aspect, in a third possible implementation of the second aspect, before sending, by the controller, the second compression parameter table to the gateway, the method further includes sending, by the controller, dynamic compression capability indication information to the gateway, where the dynamic compression capability indication information is used to indicate that the controller supports a dynamic compression rule, and the dynamic compression rule herein is a dynamic compression rule of determining the second compression parameter table according to a change of the bandwidth of the control channel of the gateway, and receiving, by the controller, a capability response message sent by the gateway, and determining, according to the capability response message, that the gateway supports the dynamic compression rule, where the capability response message is used to indicate whether the gateway supports the dynamic compression rule.

The dynamic compression capability indication information is a connection establishment message, a local extension message, or a handshake message.

Certainly, if a message sent to the controller by the gateway indicates that the gateway does not support the dynamic compression rule, the controller does not deliver the determined second compression parameter table to the gateway.

According to a third aspect, a gateway is disclosed, including a determining unit configured to determine a current operating status and a current transmission port of the gateway, where the current transmission port is a current communications port between the gateway and a controller, where the determining unit is further configured to determine a first compression parameter table according to the current operating status and the current transmission port, where the first compression parameter table includes at least one compression parameter determined by the gateway, and the first compression parameter table further indicates a priority of each compression parameter, and a transmission unit configured to transmit information to the controller according to the first compression parameter table using the current transmission port.

With reference to the third aspect, in a first possible implementation of the third aspect, the transmission unit is further configured to send the first compression parameter table to the controller, and receive a response message sent by the controller, where the response message carries a first compression parameter that is determined by the controller according to the first compression parameter table, and process to-be-transmitted information according to the first compression parameter, and send the processed information to the controller.

With reference to the third aspect or the first possible implementation of the third aspect, in a second possible implementation of the third aspect, the determining unit is further configured to, when the current operating status is a normal operating state, determine a compression parameter of the gateway in an initial operating phase and a compression parameter table of another transmission port of the gateway, where the other transmission port is a transmission port, other than the current transmission port, in transmission ports of the gateway, and determine the first compression parameter table according to the compression parameter of the gateway in the initial operating phase and the compression parameter table of the other transmission port such that the first compression parameter table is different from the compression parameter table of the other transmission port, and the first compression parameter table does not include the compression parameter of the gateway in the initial operating phase.

With reference to the third aspect or the first possible implementation of the third aspect, in a third possible implementation of the third aspect, if N transmission ports are currently configured for the gateway, and N is an integer that is greater than or equal to 2, the gateway further includes a switching unit, where the switching unit is configured to switch the N transmission ports to M transmission ports, where M is an integer that is greater than or equal to 2, and the determining unit is further configured to determine M compression parameter tables for the M transmission ports, where all the M compression parameter tables are different from N compression parameter tables of the N transmission ports.

With reference to the first possible implementation of the third aspect, in a fourth possible implementation of the third aspect, the first compression parameter is a compression parameter in the first compression parameter table, and is a compression parameter supported by the controller, or the first compression parameter is a compression parameter supported by the controller, but is not a compression parameter in the first compression parameter table.

With reference to any one of the third aspect or the first to the fourth possible implementations of the third aspect, in a fifth possible implementation of the third aspect, the transmission unit is further configured to receive a second compression parameter table sent by the controller, where the second compression parameter table includes at least one compression parameter supported by the controller, and the second compression parameter table further indicates a priority of each compression parameter supported by the controller, and the determining unit is further configured to determine a second compression parameter according to the second compression parameter table, and send the second compression parameter to the controller such that the controller processes, according to the second compression parameter, information to be transmitted to the gateway.

With reference to the fifth possible implementation of the third aspect, in a sixth possible implementation of the third aspect, the determining unit is further configured to sequentially determine, in descending order of priorities of compression parameters included in the second compression parameter table, whether the gateway supports the compression parameters included in the second compression parameter table, until a compression parameter supported by the gateway is determined, and determine the determined compression parameter supported by the gateway as the second compression parameter.

According to a fourth aspect, a controller is disclosed, including a receiving unit configured to receive a first compression parameter table sent by a gateway, where the first compression parameter table is determined by the gateway according to a current operating status of the gateway and a current transmission port of the gateway, the first compression parameter table includes at least one compression parameter, and the first compression parameter table further indicates a priority of each compression parameter, a determining unit configured to determine a first compression parameter according to the first compression parameter table, and a sending unit configured to send a response message to the gateway such that the gateway processes to-be-transmitted information according to the first compression parameter, where the response message carries the first compression parameter determined by the controller according to the first compression parameter table, and the to-be-transmitted information is information to be transmitted to the controller by the gateway.

With reference to the fourth aspect, in a first possible implementation of the fourth aspect, the determining unit is further configured to sequentially determine, in descending order of a priority of the at least one compression parameter, whether the controller supports the at least one compression parameter, until a compression parameter supported by the controller is determined, and determine the determined compression parameter supported by the controller as the first compression parameter.

With reference to the fourth aspect, in a second possible implementation of the fourth aspect, the controller further includes a monitoring unit and a processing unit, where the monitoring unit is configured to detect whether bandwidth of a control channel of the gateway changes, the determining unit is further configured to, if the monitoring unit detects that the bandwidth of the control channel of the gateway changes, generate a second compression parameter table according to current bandwidth of the control channel, where the second compression parameter table includes at least one compression parameter supported by the controller, and the second compression parameter table further indicates a priority of each compression parameter supported by the controller, the sending unit is further configured to send the second compression parameter table to the gateway such that the gateway determines a second compression parameter according to the second compression parameter table, the receiving unit is further configured to receive the second compression parameter sent by the gateway, and the processing unit is configured to process, according to the second compression parameter, information to be transmitted to the gateway.

With reference to the second possible implementation of the fourth aspect, in a third possible implementation of the fourth aspect, before the sending unit sends the second compression parameter table to the gateway, the transmission unit is further configured to send dynamic compression capability indication information to the gateway, where the dynamic compression capability indication information is used to indicate that the controller supports a dynamic compression rule, and the dynamic compression rule is a dynamic compression rule of determining the second compression parameter table according to a change of the bandwidth of the control channel of the gateway, and receive a capability response message sent by the gateway, where the capability response message is used to indicate whether the gateway supports the dynamic compression rule, and the determining unit is further configured to determine, according to the capability response message, that the gateway supports the dynamic compression rule.

The dynamic compression capability indication information is a connection establishment message, a local extension message, or a handshake message.

According to a fifth aspect, a gateway is provided, including a processor, a first interface circuit, a second interface circuit, a memory, and a bus, where the processor, the first interface circuit, the second interface circuit and the memory are connected and implement mutual communication using the bus, and the processor is configured to execute a program in the memory, to execute, in combination with the first interface circuit and the second interface circuit, the method provided in the first aspect or the possible implementations of the first aspect.

According to a sixth aspect, a controller is provided, including a processor, a first interface circuit, a second interface circuit, a memory, and a bus, where the processor, the first interface circuit, the second interface circuit, and the memory are connected and implement mutual communication using the bus, and the processor is configured to execute a program in the memory, to execute, in combination with the first interface circuit and the second interface circuit, the method provided in the second aspect or the possible implementations of the second aspect.

Optionally, the processor may be configured to execute functions of the monitoring unit and the processing unit in the fourth aspect or the possible implementations of the fourth aspect.

The first interface circuit is configured to perform a function of the receiving unit in the fourth aspect or the possible implementations of the fourth aspect.

The second interface unit is configured to perform a function of the sending unit in the fourth aspect or the possible implementations of the fourth aspect.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
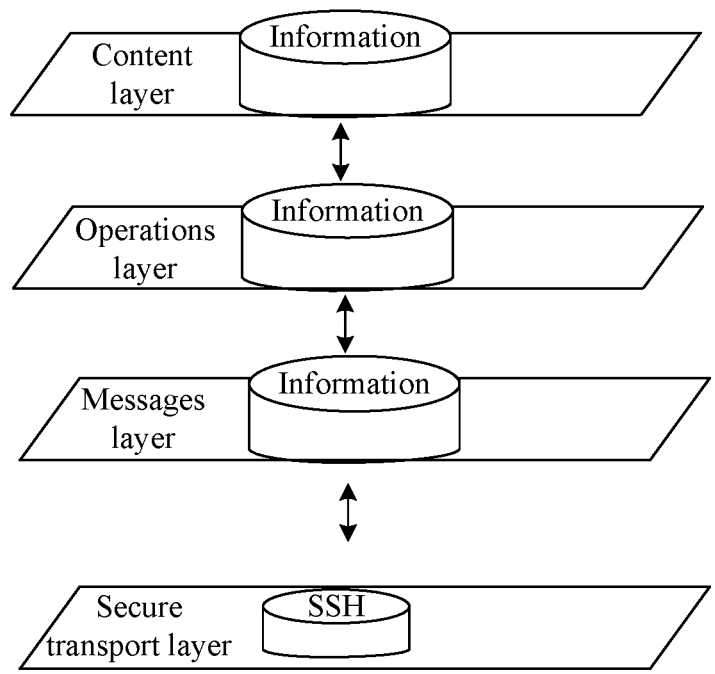
FIG. 1 is a hierarchical structural diagram of the NETCONF protocol.

Currently, a controller may be used to manage various gateways. A gateway accesses the controller using a WAN, and the gateway and the controller may transmit information according to a NETCONF protocol standard. A hierarchical structure of the NETCONF protocol is shown in FIG. 1, and includes a content layer, an operations layer, a messages layer, and a secure transport layer sequentially from top to bottom. The content layer converts to-be-transmitted information into an XML format, and the operations layer encapsulates the XML format information obtained at the content layer into an XML message. At the messages layer, each upper-layer XML message is encapsulated into a call of a Remote Procedure Call Protocol (RPC). Finally, at the secure transport layer, the encapsulated XML message is securely and reliably transmitted. Usually, the Secure Shell (SSH) protocol is selected to transmit the XML message information to the controller.

Figure 2:
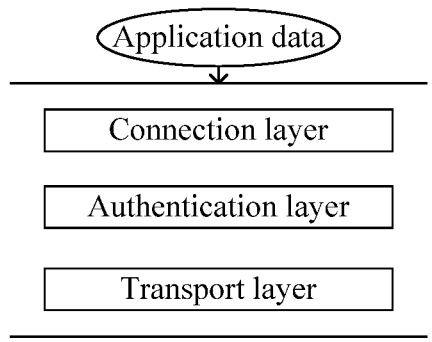
FIG. 2 is a hierarchical structural diagram of the SSH protocol.

A hierarchical structure of the SSH protocol is shown in FIG. 2, and includes a connection layer, an authentication layer, and a transport layer sequentially from top to bottom. The connection layer maps data to a transport channel, to support an SSH connection, Transmission Control Protocol (TCP) port forwarding, and x11 (one of interface protocols of a terminal) forwarding. The authentication layer completes user authentication. The transport layer provides security encryption, integrity check, and compression processing. Data at the transport layer is transmitted using a TCP connection.

Figure 3:
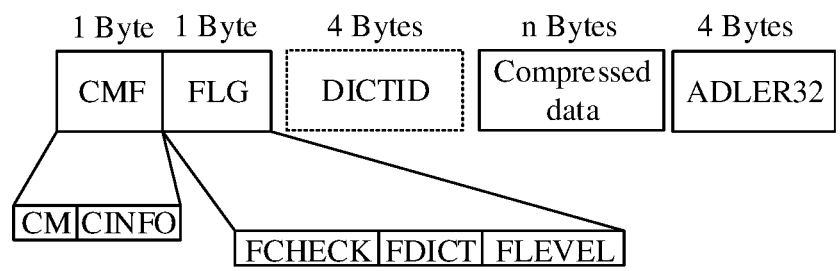
FIG. 3 is a schematic diagram of a compressed data format of Zlib.

Before the XML message is transmitted using the SSH protocol, the XML message may be compressed. The following explains and describes a compression solution Zlib of the SSH protocol in the present disclosure. FIG. 3 shows a compressed data format of Zlib. A compression method field (designated as CMF) has a length of 8 bits, and represents a compression method (designated as CM). Compression information (designated as CINFO) indicates a size of compressed data. A flag (designated as FLG) has a length of 8 bits, and is divided into three parts, where FCHECK is a check bit of CMF and FLG, FDICT is a flag of a preset dictionary, and is used to indicate whether a preset dictionary identifier (DICTID) exists, and "1" represents that 4-byte information of the DICTID exists, and FLEVEL is used to indicate a compression level, and is carried in each compression packet header. The DICTID is dictionary data, and indicates whether a compression parameter is used to perform data compression. ADLER32 is a checksum of all content except the dictionary data DICTID. In addition, the compression parameter may be a compression ratio, that is, a ratio of bytes of compressed data to bytes of uncompressed data.

Generally, after an SSH connection is established for information transmission between a gateway and a controller, the gateway and the controller negotiate a compression parameter using an SSH message. Then the gateway and the controller always use the compression parameter to compress a to-be-sent message. If the compression parameter is a relatively high compression ratio, processors of the gateway and the controller may always be heavily loaded.

In the present disclosure, the gateway obtains a compression parameter table, where the compression parameter table may be determined by the gateway according to a current operating scenario, such as an operating phase and configuration of a transmission port, or may be generated by the controller for the gateway according to a current operating scenario of the gateway after the controller and the gateway establish a connection, and sent to the gateway by the controller. Then the gateway sends the compression parameter table to the controller such that the gateway and the controller negotiate a compression parameter. A case of always using a same compression parameter to perform information compression during information transmission is avoided, thereby reducing CPU processing load and reducing a processing time.

Figure 4:
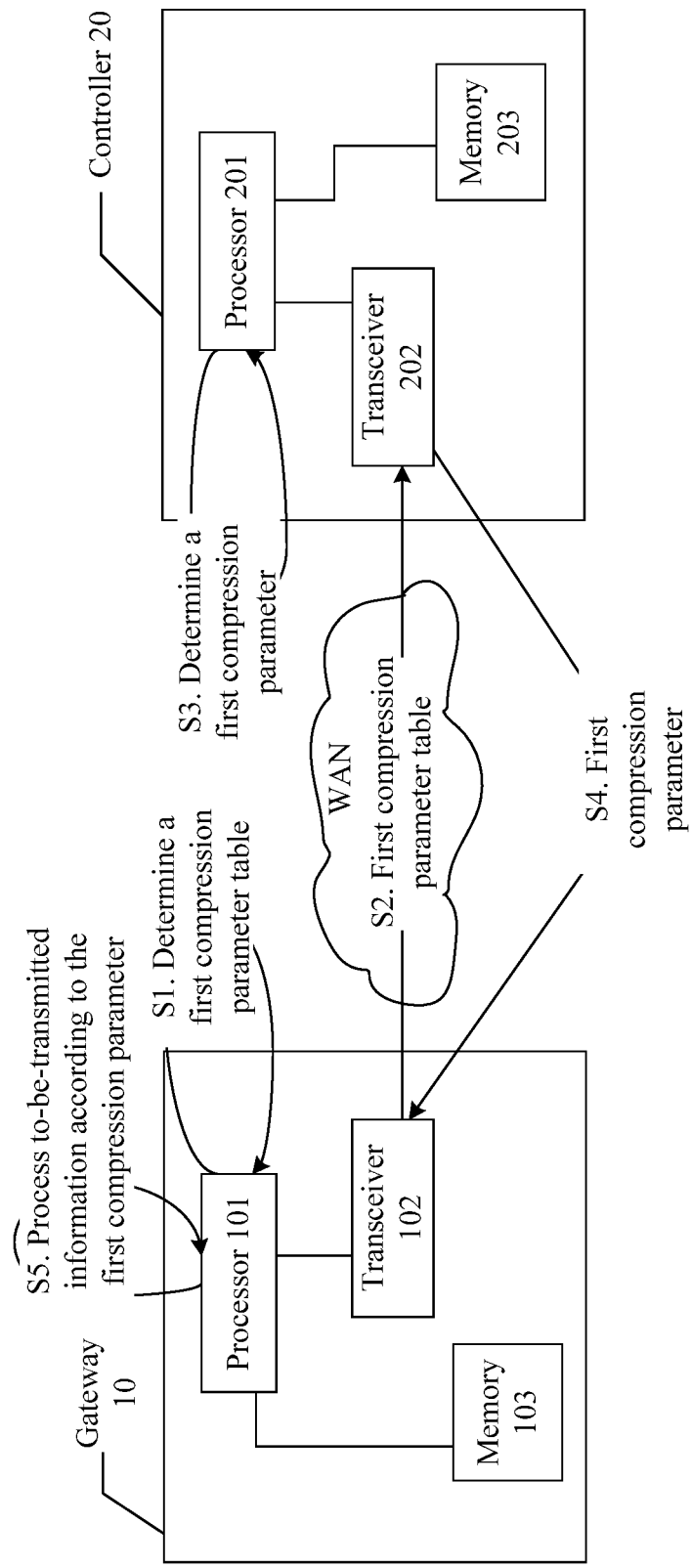
FIG. 4 is an architectural diagram of a communications system according to an embodiment of the present disclosure.

An embodiment of the present disclosure provides a communications system. As shown in FIG. 4, the communications system includes a gateway 10 and a controller 20, and the gateway 10 and the controller 20 communicate with each other using a WAN. As shown in FIG. 4, the gateway 10 includes a processor 101, a transceiver 102, and a memory 103. The controller 20 includes a processor 201, a transceiver 202, and a memory 203.

Referring to FIG. 4, an information transmission method provided in the present disclosure includes the following steps.

Step S1. The processor 101 determines a current operating status and a current transmission port of the gateway 10, and determines a first compression parameter table according to the current operating status and the current transmission port. The current transmission port is a current communications port between the gateway and the controller. The first compression parameter table includes at least one compression parameter determined by the gateway, and the first compression parameter table further indicates a priority of each compression parameter.

Determining a first compression parameter table according to the current operating status and the current transmission port further includes determining the first compression parameter table according to the current operating status, a type of the current transmission port, and bandwidth of a control channel on which the current transmission port is located. The type of the current transmission port includes a wired port or a wireless port.

Step S2. The transceiver 102 sends the first compression parameter table to the controller 20, and the transceiver 202 receives the first compression parameter table.

Step S3. The processor 201 determines a first compression parameter according to the first compression parameter table.

Step S4. The transceiver 202 sends a response message to the gateway 10, and the transceiver 102 receives the response message. The response message carries the first compression parameter.

Step S5. The processor 101 processes to-be-transmitted information according to the first compression parameter.

The response message carries the first compression parameter determined by the controller according to the first compression parameter table, and the to-be-transmitted information is information to be transmitted to the controller by the gateway.

In addition, it should be noted that the processor 101 and the processor 201 each may be a CPU.

The transceiver 102 and the transceiver 202 each may be implemented by an optical transceiver, an electrical transceiver, a wireless transceiver, or any combination of the optical transceiver, the electrical transceiver, and the wireless transceiver. For example, the optical transceiver may be a small form-factor pluggable (SFP) transceiver, an enhanced SFP (SFP+) transceiver, or a 10 Gigabit SFP (XFP) transceiver. The electrical transceiver may be an Ethernet network interface controller (NIC). The wireless transceiver may be a wireless NIC (WNIC).

The memory 103 (memory 203) is configured to store program code, and transmit the program code to the processor 101 (processor 201), and the processor 101 (processor 201) executes the program code to implement the technical solutions in the present disclosure. The memory 103 (memory 203) may include a volatile memory, for example, a random access memory (RAM). Alternatively, the memory 103 (memory 203) may include a non-volatile memory, for example, a read-only memory (ROM), a flash memory, a hard disk drive (HDD), or a solid-state drive (SSD). Alternatively, the memory 103 (memory 203) may include a combination of the foregoing types of memories.

According to the communications system provided in this embodiment of the present disclosure, the gateway may determine a compression parameter table according to a current transmission scenario (for example, a current operating status, a current transmission port, and transmission bandwidth), send the compression parameter table to the controller, and negotiate a compression parameter with the controller. Therefore, the present disclosure provides a dynamic compression solution, the compression parameter can be flexibly adjusted according to an operating status and a transmission port of the gateway, and an optimal combination of processor performance and bandwidth can be implemented. An increase in CPU processing load or over occupation of bandwidth in the other approaches caused because information compression is always performed during information transmission is avoided. According to the method provided in the present disclosure, the CPU processing load can be reduced, thereby reducing a processing time. In addition, the bandwidth is not over occupied, thereby implementing proper utilization of the bandwidth.

Figure 5:
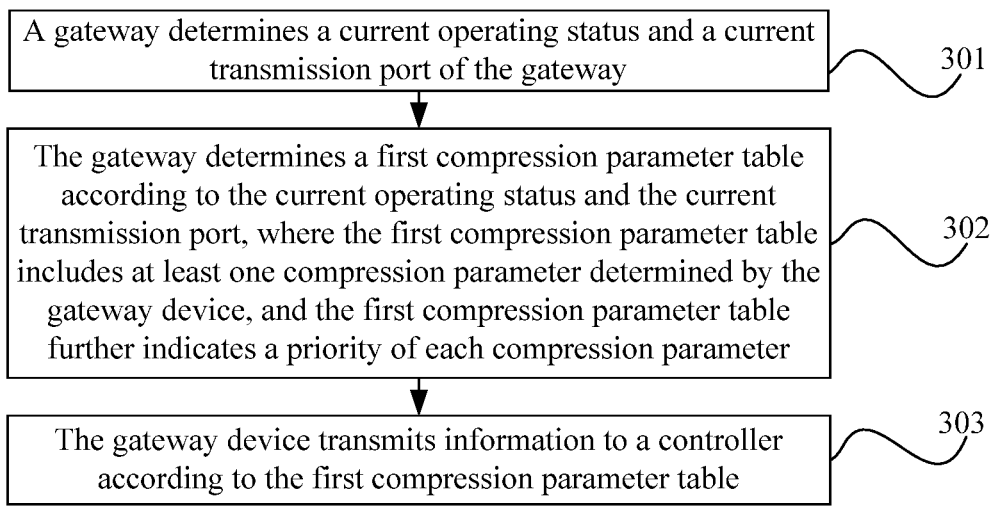
FIG. 5 is a schematic flowchart of an information transmission method according to an embodiment of the present disclosure.

An embodiment of the present disclosure provides an information transmission method. As shown in FIG. 5, the method includes the following steps.

Step 301. A gateway determines a current operating status and a current transmission port of the gateway.

It should be noted that the current transmission port is a current communications port between the gateway and a controller. The current operating status may be an initial operating phase, or may be a normal operating state. The initial operating phase is a phase in which the gateway performs configuration and data synchronization after starting to operate, and a normal operating phase is a phase after the gateway completes the configuration and the data synchronization. Certainly, a processing capability of a processor of the gateway in the initial operating phase is usually higher than a processing capability of the processor in the normal operating state.

Step 302. The gateway determines a first compression parameter table according to the current operating status and the current transmission port, where the first compression parameter table includes at least one compression parameter determined by the gateway, and the first compression parameter table further indicates a priority of each compression parameter.

Determining a first compression parameter table according to the current operating status and the current transmission port further includes determining the first compression parameter table according to the current operating status, a type of the current transmission port, and bandwidth of a control channel on which the current transmission port is located. The type of the current transmission port includes a wired port or a wireless port. The compression parameter may be a compression ratio used when compression processing is performed on information. For example, a compression parameter none represents that no compression is performed, a compression parameter zlib0 represents that compression is performed at a compression ratio corresponding to FLEVEL=0, a compression parameter zlib1 represents that compression is performed at a compression ratio corresponding to FLEVEL=1, and a compression parameter zlib2 represents that compression is performed at a compression ratio corresponding to FLEVEL=2. A sequence of compression parameters in the first compression parameter table indicates priorities of the compression parameters. For example, the first compression parameter table sequentially includes compression parameters zlib1, zlib2, and zlib0. That is, it indicates that a priority of the compression parameter zlib1 is the highest, and the gateway preferentially uses the compression parameter corresponding to zlib1 to compress the information.

When the current transmission port is a wired port, bandwidth costs are relatively low, and the at least one compression parameter includes a compression parameter with a relatively large compression ratio. When the current transmission port is a wireless port, bandwidth costs are relatively high, and the at least one compression parameter includes a compression parameter with a relatively small compression ratio. The compression ratio is defined as a compressed data amount/an uncompressed data amount.

During specific implementation, when the current operating status is the normal operating state, the gateway determines a compression parameter of the gateway in the initial operating phase and a compression parameter table of another transmission port of the gateway. The other transmission port is a transmission port, other than the current transmission port, in transmission ports of the gateway. It should be noted that the gateway may determine one compression parameter table for each transmission port between the gateway and the controller, and the compression parameter table of the other transmission port of the gateway herein is a compression parameter table of any transmission port, other than the current transmission port, between the gateway and the controller.

In a single-port transmission scenario (that is, only one transmission port can be used in a single time of information transmission between the gateway and the controller), the gateway determines the first compression parameter table according to the compression parameter that is set during initial operating of the gateway and the compression parameter table of the other transmission port configured for the gateway such that the first compression parameter table is different from the compression parameter table of the other transmission port of the gateway, and the first compression parameter table does not include the compression parameter of the gateway in the initial operating phase.

Herein, a reason why the compression parameter in the normal operating state is set to be different from the compression parameter in the initial operating phase is that a processor in an initial state has relatively light processing load, and may use a compression parameter with a relatively small compression ratio (for example, a compression ratio of 20%, that is, a ratio of bytes of compressed data to bytes of uncompressed data is 20%) to fast compress information such that relatively low bandwidth is occupied during information transmission, and the controller may receive compressed information in a relatively short time, to fast pass the initial phase. To sum up, processing capabilities of the processor of the gateway in the normal operating state and in the initial operating phase are definitely different, and therefore different compression parameters need to be set.

In addition, a reason why the first compression parameter table is set to be different from the compression parameter table of the other transmission port configured for the gateway is to ensure that in a scenario of a single transmission port, after the gateway switches the transmission port, a compression parameter table of the current transmission port is different from that of a previous transmission port.

In a scenario of multiple transmission ports (that is, N transmission ports are currently configured for the gateway, and N is an integer that is greater than or equal to 2), after the gateway switches the N transmission ports to M transmission ports, the gateway determines M compression parameter tables for the M transmission ports, where all the M compression parameter tables are different from N compression parameter tables of the N transmission ports, and M is an integer that is greater than or equal to 2. This is to ensure that after the gateway switches the transmission ports, compression parameter tables of the current transmission ports are still different from those of previous transmission ports.

In addition, it should be noted that a compression parameter table indicates priorities of compression parameters, and therefore different compression parameter tables mean that compression parameters included in the compression parameter tables are not completely the same, or compression parameters included in the compression parameter tables are the same, but sequences of the compression parameters are different. For example, a compression parameter table 1 sequentially includes compression parameters zlib1, zlib2, and zlib0, and a compression parameter table 2 sequentially includes compression parameters zlib0, zlib1, and zlib2. Although both the compression parameter table 1 and the compression parameter table 2 include the three compression parameters zlib0, zlib1, and zlib2, sequences of the three compression parameters are different, and therefore the compression parameter table 1 and the compression parameter table 2 are different compression parameter tables.

Step 303. The gateway transmits information to a controller according to the first compression parameter table using the current transmission port.

During specific implementation, the gateway and the controller may negotiate a compression parameter according to the first compression parameter table. For example, the gateway sends the first compression parameter table to the controller, and receives a response message sent by the controller, where the response message carries a first compression parameter that is determined by the controller according to the first compression parameter table. Finally, the gateway processes to-be-transmitted information according to the first compression parameter, and sends processed information to the controller.

It should be noted that the first compression parameter herein may be a compression parameter in the first compression parameter table, or may not be a compression parameter in the first compression parameter table, but is necessarily a compression parameter supported by the controller. That is, the first compression parameter determined by the controller according to the first compression parameter table is not necessarily a compression parameter in the first compression parameter table. For example, the first compression parameter table includes a compression parameter 1, a compression parameter 2, and a compression parameter 3, but the controller does not support compression, and then the determined first compression parameter may be a compression parameter 0 (representing that no compression is to be performed).

In this way, the gateway determines multiple compression parameters according to the current operating status and the current transmission port, and then negotiates with the controller using the foregoing procedure to determine a final compression parameter used for information processing.

If the first compression parameter indicates that compression is to be performed on data, finally, the gateway may encapsulate, according to the format shown in FIG. 3, the to-be-transmitted information into a packet, and transmit the packet to the controller.

In an embodiment of the present disclosure, when detecting that a scenario changes, the controller proactively sends a second compression parameter table to the gateway to trigger a compression policy update.

The gateway receives the second compression parameter table sent by the controller, where the second compression parameter table includes at least one compression parameter supported by the controller, and the second compression parameter table further indicates a priority of each compression parameter supported by the controller.

The gateway determines a second compression parameter according to the second compression parameter table, and sends the second compression parameter to the controller such that the controller processes, according to the second compression parameter, information to be transmitted to the gateway.

In this way, the controller negotiates a compression parameter with the gateway using the second compression parameter table, and the controller finally processes, according to the compression parameter, the information to be transmitted to the gateway.

Further, determining, by the gateway, a second compression parameter according to the second compression parameter table includes sequentially determining, by the gateway in descending order of priorities of compression parameters included in the second compression parameter table, whether the gateway supports the compression parameters included in the second compression parameter table, until a compression parameter supported by the gateway is determined, and determining the determined compression parameter supported by the gateway as the second compression parameter.

The compression parameter table indicates the priority of each compression parameter, and therefore the gateway needs to sequentially determine whether the gateway supports the compression parameters included in the second compression parameter table. For example, the second compression parameter table includes a compression parameter 1, a compression parameter 2, and a compression parameter 3. The gateway first needs to determine whether the gateway supports the compression parameter 1, if the gateway does not support the compression parameter 1, the gateway determines whether the gateway supports the compression parameter 2, and if the gateway supports the compression parameter 2, the gateway determines that the second compression parameter is the compression parameter 2. Certainly, if the gateway does not support any compression parameter included in the second compression parameter table, the gateway determines a compression parameter supported by the gateway as the second compression parameter.

In this embodiment of the present disclosure, before the gateway determines the current operating status and the current transmission port of the gateway, the gateway may further send dynamic compression capability indication information to the controller, where the dynamic compression capability indication information is used to indicate that the gateway supports a dynamic compression rule, and the dynamic compression rule herein is a dynamic compression rule of determining the first compression parameter table according to the current operating status and the current transmission port.

The gateway receives a capability response message sent by the controller, and determines, according to the capability response message, that the controller supports the dynamic compression rule, where the capability response message is used to indicate whether the controller supports the dynamic compression rule.

Certainly, this is merely an optional step, that is, regardless of whether the controller supports the dynamic compression rule, the gateway can determine the compression parameter table according to the local current operating status and the current transmission port.

The dynamic compression capability indication information is a connection establishment message (SSH_MSG_INITS), a local extension message, or a handshake message (e.g. hello).

During specific implementation, a new identifier is added into compression manner negotiation options in an SSH_MSG_INITS message to indicate that the dynamic compression rule is supported, and is the last option in the compression manner negotiation options. In this way, when the gateway and the controller establish a connection, the controller may learn, using the SSH_MSG_INITS message, whether the gateway supports the dynamic compression rule, and further the gateway may learn, using the capability response message fed back by the controller, whether the controller supports the dynamic compression rule.

Alternatively, the gateway defines the local extension message, and notifies, using the redefined local extension message, the controller that the gateway supports the dynamic compression rule. Further, one type in message types 192-255 may be used to define a notification message for indicating that the dynamic compression rule is supported. If the controller cannot identify the notification message, the controller returns a response message SSH_MSG_UNIMPLEMENTED in conformity with a protocol agreement. In this way, it may be learned that the controller does not support the dynamic compression rule. If the controller supports the dynamic compression rule, the controller may return an acknowledgement response. It should be noted that the notification message is sent to the controller after an SSH connection is established.

Alternatively, the gateway may also add identification information (indicating whether the dynamic compression rule is supported) into capability negotiation of a hello message in an initial NETCONF phase (that is, a phase prior to a four-layer protocol shown in FIG. 1), to notify the controller whether the gateway supports the dynamic compression rule. In this case, it needs to be ensured that a name and a namespace of the identification information are specified.

According to the information transmission method provided in this embodiment of the present disclosure, the gateway may determine a compression parameter table according to a current transmission scenario (for example, a current operating status, a current transmission port, and transmission bandwidth), send the compression parameter table to the controller, and negotiate a compression parameter with the controller. Therefore, the present disclosure provides a dynamic compression solution, the compression parameter can be flexibly adjusted according to an operating status and a transmission port, and an optimal combination of processor performance and bandwidth can be implemented. An increase in CPU processing load or over occupation of bandwidth in the other approaches caused because information compression is always performed during information transmission is avoided. According to the method provided in the present disclosure, the CPU processing load can be reduced, thereby reducing a processing time. In addition, the bandwidth is not over occupied, thereby implementing proper utilization of the bandwidth.

Figure 6:
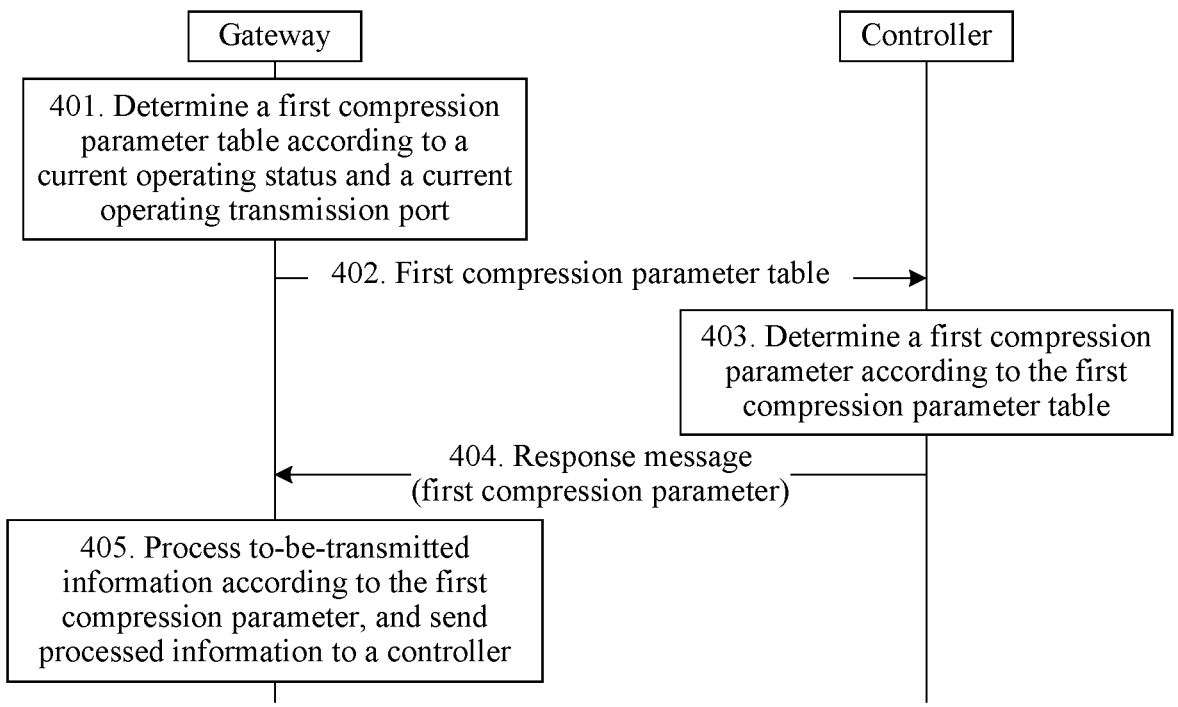
FIG. 6 is a schematic flowchart of another information transmission method according to an embodiment of the present disclosure.

An embodiment of the present disclosure provides an information transmission method. As shown in FIG. 6, the method includes the following steps.

Step 401. A gateway determines a first compression parameter table according to a current operating status and a current transmission port.

Further, when the current operating status is a normal operating state, the gateway determines a compression parameter of the gateway in an initial operating phase and a compression parameter table of another transmission port of the gateway.

The gateway determines the first compression parameter table according to the compression parameter of the gateway in the initial operating phase and the compression parameter table of the other transmission port of the gateway such that the first compression parameter table is different from the compression parameter table of the other transmission port of the gateway, and the first compression parameter table does not include the compression parameter of the gateway in the initial operating phase.

In addition, if N transmission ports are currently configured for the gateway, and N is an integer that is greater than or equal to 2, after switching the N transmission ports to M transmission ports, the gateway determines M compression parameter tables for the M transmission ports, where all the M compression parameter tables are different from N compression parameter tables of the N transmission ports, and M is an integer that is greater than or equal to 2.

It should be noted that the first compression parameter table includes at least one compression parameter, and the first compression parameter table further indicates a priority of each compression parameter.

Step 402. The gateway sends the first compression parameter table to a controller.

Step 403. The controller receives the first compression parameter table sent by the gateway, and determines a first compression parameter according to the first compression parameter table.

Further, the controller sequentially determines, in descending order of a priority of the at least one compression parameter (that is, the compression parameter included in the first compression parameter table), whether the controller supports the at least one compression parameter, until a compression parameter supported by the controller is determined, and determines the compression parameter supported by the controller as the first compression parameter.

Step 404. The controller sends response message to the gateway. The response message carries the first compression parameter.

Step 405. The gateway receives the response message, processes to-be-transmitted information according to the first compression parameter, and sends processed information to the controller.

Figure 7:
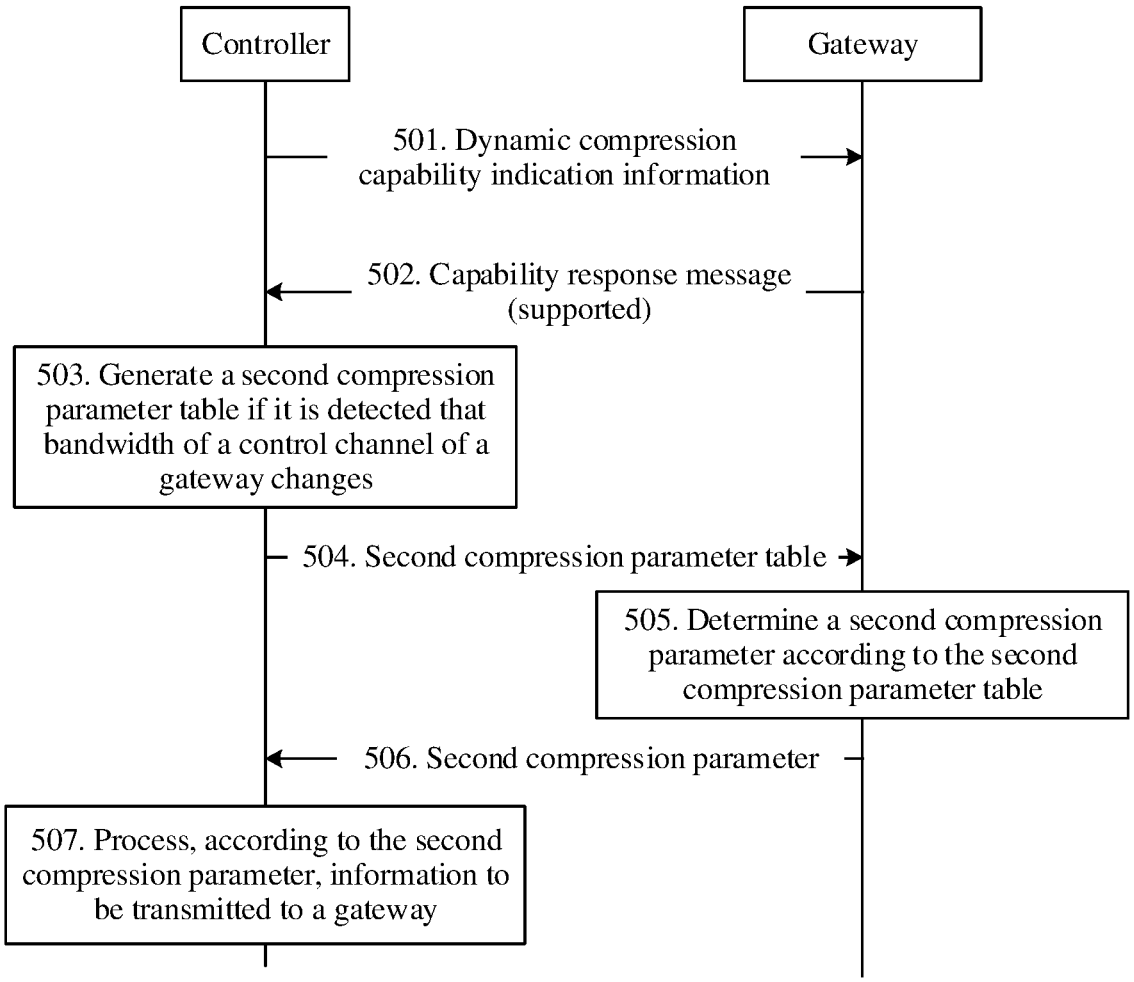
FIG. 7 is a schematic flowchart of still another information transmission method according to an embodiment of the present disclosure.

An embodiment of the present disclosure further provides an information transmission method. As shown in FIG. 7, on the basis of the information transmission method shown in FIG. 6, the information transmission method provided in this embodiment of the present disclosure further includes the following steps.

Step 501. The controller sends dynamic compression capability indication information to the gateway.

The dynamic compression capability indication information is used to indicate that the controller supports a dynamic compression rule, and the dynamic compression rule is a dynamic compression rule of determining a second compression parameter table according to a change of bandwidth of a control channel of the gateway.

Step 502. The controller receives a capability response message sent by the gateway, and determines, according to the capability response message, that the gateway supports the dynamic compression rule.

The capability response message is used to indicate whether the gateway supports the dynamic compression rule. The dynamic compression capability indication information is a connection establishment message, a local extension message, or a handshake message.

Step 503. If the controller detects that bandwidth of a control channel of the gateway changes, the controller generates a second compression parameter table according to current bandwidth of the control channel.

The second compression parameter table includes at least one compression parameter supported by the controller, and the second compression parameter table further indicates a priority of each compression parameter supported by the controller.

It should be noted that the bandwidth of the control channel of the gateway is bandwidth of a TCP connection corresponding to the gateway.

Step 504. The controller sends the second compression parameter table to the gateway.

Certainly, if the capability response message sent to the controller by the gateway indicates that the gateway does not support the dynamic compression rule, the controller does not deliver the second compression parameter table to the gateway.

Step 505. The gateway receives the second compression parameter table, and determines a second compression parameter according to the second compression parameter table.

The gateway sequentially determines, in descending order of priorities of compression parameters included in the second compression parameter table, whether the gateway supports the compression parameters included in the second compression parameter table, until a compression parameter supported by the gateway is determined, and determines the determined compression parameter supported by the gateway as the second compression parameter.

Certainly, if the gateway does not support any compression parameter in the second compression parameter table, the gateway determines a compression parameter supported by the gateway as the second compression parameter.

If the second compression parameter is a compression ratio, and indicates that compression is to be performed on data, the controller may finally encapsulate, according to the format shown in FIG. 3, the to-be-transmitted information into a packet, and transmit the packet to the gateway.

Step 506. The gateway sends the second compression parameter to the controller.

Step 507. The controller receives the second compression parameter sent by the gateway, and processes, according to the second compression parameter, information to be transmitted to the gateway.

That is, after detecting that the bandwidth of the control channel of the gateway changes, the controller proactively triggers a compression parameter update, and sends the second compression parameter table to the gateway in order to negotiate a compression parameter, and the controller processes, according to the compression parameter, the information to be transmitted to the gateway.

According to the information transmission method provided in this embodiment of the present disclosure, the gateway may determine a compression parameter table according to a current transmission scenario (for example, a current operating status, a current transmission port, and transmission bandwidth), and send the compression parameter table to the controller, and negotiate a compression parameter with the controller. Therefore, the present disclosure provides a dynamic compression solution, the compression parameter can be flexibly adjusted according to an operating status and a transmission port, and an optimal combination of processor performance and bandwidth can be implemented. An increase in CPU processing load or over occupation of bandwidth in the other approaches caused because information compression is always performed during information transmission is avoided. According to the method provided in the present disclosure, the CPU processing load can be reduced, thereby reducing a processing time. In addition, the bandwidth is not over occupied, thereby implementing proper utilization of the bandwidth.

Figure 8:
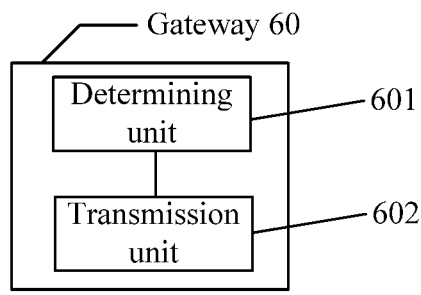
FIG. 8 is a structural block diagram of a gateway according to an embodiment of the present disclosure.

An embodiment of the present disclosure provides a gateway 60. As shown in FIG. 8, the gateway 60 includes a determining unit 601 and a transmission unit 602. The gateway 60 can be applied to the methods shown in FIG. 5 to FIG. 7.

The determining unit 601 is configured to determine a current operating status and a current transmission port, where the current transmission port is a current communications port between the gateway and a controller.

The determining unit 601 is further configured to determine a first compression parameter table according to the current operating status and the current transmission port, where the first compression parameter table includes at least one compression parameter determined by the gateway, and the first compression parameter table further indicates a priority of each compression parameter.

The transmission unit 602 is configured to transmit information to the controller according to the first compression parameter table using the current transmission port.

The transmission unit 602 is further configured to send the first compression parameter table to the controller, and receive a response message sent by the controller, where the response message carries a first compression parameter that is determined by the controller according to the first compression parameter table, and process to-be-transmitted information according to the first compression parameter, and send the processed information to the controller.

The determining unit 601 is further configured to, when the current operating status is a normal operating state, determine a compression parameter of the gateway in an initial operating phase and a compression parameter table of another transmission port configured for the gateway, where the other transmission port is a transmission port, other than the current transmission port, in transmission ports configured for the gateway.

The first compression parameter table is determined according to the compression parameter that is set during initial operating of the gateway 60 and the compression parameter table of the other transmission port configured for the gateway 60 such that the first compression parameter table is different from the compression parameter table of the other transmission port configured for the gateway 60, and the first compression parameter table does not include the compression parameter that is set during the initial operating of the gateway 60.

Figure 9:
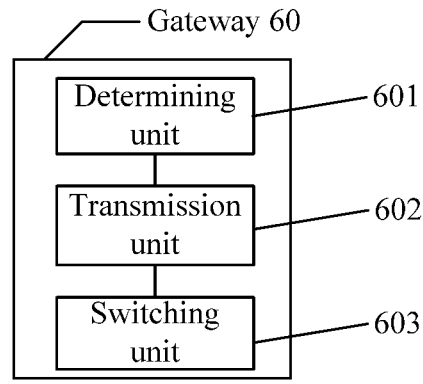
FIG. 9 is another structural block diagram of a gateway according to an embodiment of the present disclosure.

If N transmission ports are currently configured for the gateway 60, and N is an integer that is greater than or equal to 2, as shown in FIG. 9, the gateway 60 further includes a switching unit 603.

The switching unit 603 is configured to switch the N transmission ports to M transmission ports, where M is an integer that is greater than or equal to 2.

The determining unit 601 is further configured to determine M compression parameter tables for the M transmission ports, where all the M compression parameter tables are different from N compression parameter tables of the N transmission ports.

It should be noted that the first compression parameter is a compression parameter in the first compression parameter table, and is a compression parameter supported by the controller, or the first compression parameter is a compression parameter supported by the controller, but is not a compression parameter in the first compression parameter table.

The transmission unit 602 is further configured to receive a second compression parameter table sent by the controller, where the second compression parameter table includes at least one compression parameter supported by the controller, and the second compression parameter table further indicates a priority of each compression parameter of the controller.

The determining unit 601 is further configured to determine a second compression parameter according to the second compression parameter table, and send the second compression parameter to the controller such that the controller processes, according to the second compression parameter, information to be transmitted to the gateway.

Further, the determining unit 601 is further configured to sequentially determine, in descending order of priorities of compression parameters included in the second compression parameter table, whether the gateway supports the compression parameters included in the second compression parameter table, until a compression parameter supported by the gateway is determined, and determine the determined compression parameter supported by the gateway as the second compression parameter.

It should be noted that the transmission unit 602 may be the transceiver 102 of the gateway 10, but a function of processing to-be-transmitted data by the transmission unit 602 is implemented by the processor 101 of the gateway 10. The determining unit 601 and the switching unit 603 may be integrated in the processor 101 of the gateway 10 for implementation, or may be stored in the memory 103 of the gateway 10 in a form of program code such that the processor 101 of the gateway invokes the code stored in the memory 103 to perform functions of the determining unit 601 and the switching unit 603.

The gateway 60 provided in this embodiment of the present disclosure may determine a compression parameter table according to a current transmission scenario (for example, a current operating status, a current transmission port, and transmission bandwidth), send the compression parameter table to the controller, and negotiate a compression parameter with the controller. The gateway provided in the present disclosure can flexibly adjust the compression parameter according to an operating status and a transmission port, and implement an optimal combination of processor performance and bandwidth. An increase in CPU processing load or over occupation of bandwidth in the other approaches caused because information compression is always performed during information transmission is avoided. According to the gateway provided in the present disclosure, the CPU processing load can be reduced, thereby reducing a processing time. In addition, the bandwidth is not over occupied, thereby implementing proper utilization of the bandwidth.

Figure 10:
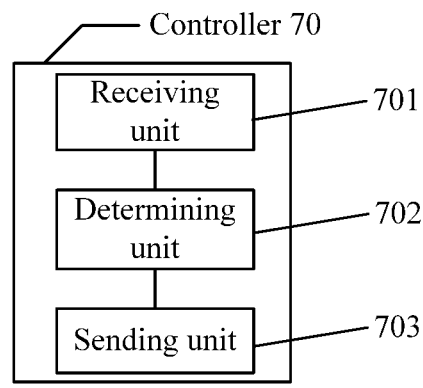
FIG. 10 is a structural block diagram of a controller according to an embodiment of the present disclosure.

An embodiment of the present disclosure provides a controller 70. As shown in FIG. 10, the controller 70 includes a receiving unit 701, a determining unit 702, and a sending unit 703. The controller 70 can be applied to the methods shown in FIG. 5 to FIG. 7.

The receiving unit 701 is configured to receive a first compression parameter table sent by a gateway, where the first compression parameter table is determined by the gateway according to a current operating status of the gateway and a current transmission port of the gateway, the first compression parameter table includes at least one compression parameter, and the first compression parameter table further indicates a priority of each compression parameter.

The determining unit 702 is configured to determine a first compression parameter according to the first compression parameter table.

The sending unit 703 is configured to send a response message to the gateway such that the gateway processes to-be-transmitted information according to the first compression parameter, where the response message carries the first compression parameter determined by the controller according to the first compression parameter table, and the to-be-transmitted information is information to be transmitted to the controller by the gateway.

The determining unit 702 is further configured to sequentially determine, in descending order of a priority of the at least one compression parameter, whether the controller supports the at least one compression parameter, until a compression parameter supported by the controller is determined, and determine the determined compression parameter supported by the controller as the first compression parameter.

Figure 11:
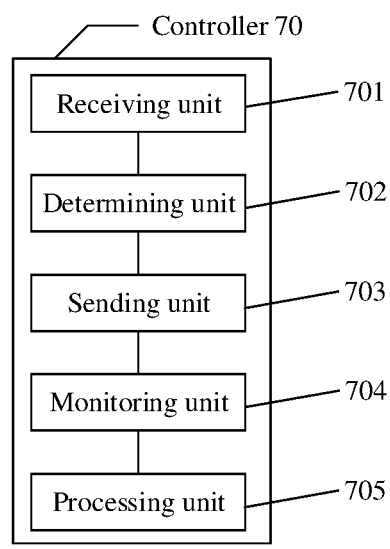
FIG. 11 is another structural block diagram of a controller according to an embodiment of the present disclosure.

As shown in FIG. 11, the controller 70 further includes a monitoring unit 704 and a processing unit 705.

The monitoring unit 704 is configured to detect whether bandwidth of a control channel of the gateway changes.

The determining unit 702 is further configured to, if the monitoring unit 704 detects that the bandwidth of the control channel of the gateway changes, generate a second compression parameter table according to current bandwidth of the gateway, where the second compression parameter table includes at least one compression parameter supported by the controller, and the second compression parameter table further indicates a priority of each compression parameter supported by the controller.

The sending unit 703 is further configured to send the second compression parameter table to the gateway such that the gateway determines a second compression parameter according to the second compression parameter table.

The receiving unit 701 is further configured to receive the second compression parameter sent by the gateway.

The processing unit 705 is configured to process, according to the second compression parameter, information to be transmitted to the gateway.

The sending unit 703 is further configured to, before the determining unit 702 determines the second compression parameter table, send dynamic compression capability indication information to the gateway, where the dynamic compression capability indication information is used to indicate that the controller 70 supports a dynamic compression rule, and the dynamic compression rule is a dynamic compression rule of determining the second compression parameter table according to a change of the bandwidth of the control channel of the gateway.

The receiving unit 701 is further configured to receive a capability response message sent by the gateway, where the capability response message is used to indicate whether the gateway supports the dynamic compression rule.

The determining unit 702 is further configured to determine, according to the capability response message, that the gateway supports the dynamic compression rule.

The dynamic compression capability indication information is a connection establishment message, a local extension message, or a handshake message.

It should be noted that the receiving unit 701 may be a receiver of the controller, the sending unit 703 may be a transmitter of the controller, and the receiver and the controller may be integrated together into the transceiver 202 of the controller. The determining unit 702, the monitoring unit 704, and the processing unit 705 may be integrated in the processor 201 of the controller for implementation, or may be stored in the memory 203 of the controller in a form of program code such that the processor 201 of the controller invokes the code stored in the memory 203 to perform functions of the determining unit 702, the monitoring unit 704, and the processing unit 705.

The controller 70 provided in this embodiment of the present disclosure may determine a compression parameter table according to a current transmission scenario (for example, transmission bandwidth), send the compression parameter table to the gateway, and negotiate a compression parameter with the gateway. The compression parameter can be flexibly adjusted, and an optimal combination of processor performance and bandwidth can be implemented. An increase in CPU processing load or over occupation of bandwidth in the other approaches caused because information compression is always performed during information transmission is avoided. According to the controller provided in the present disclosure, the CPU processing load can be reduced, thereby reducing a processing time. In addition, the bandwidth is not over occupied, thereby implementing proper utilization of the bandwidth.

The foregoing descriptions about implementations allow a person skilled in the art to clearly understand that, for the purpose of convenient and brief description, division of the foregoing function modules is only taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein again.

The units described as separate parts may or may not be physically separate, and parts displayed as units may be one or more physical units, may be located in one place, or may be distributed in different places. Some or all of the units may be selected according to actual requirements to achieve the objectives of the solutions of the embodiments. In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of a software functional unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information transmission method, comprising:
    determining, by a gateway, a current operating status and a current transmission port of the gateway, wherein the current transmission port is located between the gateway and a controller;
    determining, by the gateway, a first compression parameter table according to the current operating status and the current transmission port, wherein the first compression parameter table comprises at least one compression parameter determined by the gateway, and wherein the first compression parameter table further indicates a priority of each compression parameter; and
    transmitting, by the gateway, information to the controller according to the first compression parameter table using the current transmission port.

2. The information transmission method of claim 1, wherein transmitting the information to the controller comprises:
    sending, by the gateway, the first compression parameter table to the controller;
    receiving, by the gateway, a response message from the controller, wherein the response message carries a first compression parameter determined by the controller according to the first compression parameter table;
    processing, by the gateway, to-be-transmitted information according to the first compression parameter; and
    sending, by the gateway, the processed to-be-transmitted information to the controller.

3. The information transmission method of claim 1, wherein determining the first compression parameter table comprises:
    determining, by the gateway, a compression parameter of the gateway in an initial operating phase and a compression parameter table of another transmission port of the gateway when the current operating status comprises a normal operating state, wherein the other transmission port comprises a transmission port other than the current transmission port in transmission ports of the gateway; and
    determining, by the gateway, the first compression parameter table according to the compression parameter of the gateway in the initial operating phase and the compression parameter table of the other transmission port, wherein the first compression parameter table is different from the compression parameter table of the other transmission port, and wherein the first compression parameter table does not comprise the compression parameter of the gateway in the initial operating phase.

4. The information transmission method of claim 1, wherein when N transmission ports are currently configured for the gateway and the N comprises an integer greater than or equal to two, the information transmission method further comprises:
    switching, by the gateway, the N transmission ports to M transmission ports; and
    determining, by the gateway, NI compression parameter tables for the M transmission ports, wherein all the M compression parameter tables are different from N compression parameter tables of the N transmission ports, and wherein the M comprises an integer greater than or equal to two.

5. The information transmission method of claim 2, wherein the first compression parameter comprises:
    a compression parameter in the first compression parameter table and supported by the controller: or
    a compression parameter supported by the controller and not comprised in the first compression parameter table.

6. The information transmission method of claim 1, further comprising:
    receiving, by the gateway, a second compression parameter table from the controller, wherein the second compression parameter table comprises at least one compression parameter supported by the controller, wherein the second compression parameter table further indicates a priority of each compression parameter supported by the controller;

determining, by the gateway, a second compression parameter according to the second compression parameter table; and sending, by the gateway, the second compression parameter to the controller to enable the controller to process, according to the second compression parameter, information to be transmitted to the gateway.

7. The information transmission method of claim 6, wherein determining the second compression parameter comprises:

sequentially determining, by the gateway in descending order of priorities of compression parameters comprised in the second compression parameter table, whether the gateway supports the compression parameters comprised in the second compression parameter table, until a compression parameter supported by the gateway is determined; and determining, by the gateway, the compression parameter supported by the gateway as the second compression parameter.

8. An information transmission method, comprising:

receiving, by a controller, a first compression parameter table from a gateway, wherein the first compression parameter table is determined by the gateway according to a current operating status of the gateway and a current transmission port of the gateway, wherein, the first compression parameter table comprises at least one compression parameter, and wherein the first compression parameter table further indicates a priority of each compression parameter;

determining, by the controller, a first compression parameter according to the first compression parameter table; and sending, by the controller, a response message to the gateway to enable the gateway to process to-be-transmitted information according to the first compression parameter, wherein the response message carries the first compression parameter, and wherein the to-be-transmitted information comprises information to be transmitted to the controller by the gateway.

9. The information transmission method of claim 8, wherein determining the first compression parameter comprises:

sequentially determining, by the controller in descending order of a priority of the at least one compression parameter, whether the controller supports the at least one compression parameter, until a compression parameter supported by the controller is determined; and determining, by the controller, the compression parameter supported by the controller as the first compression parameter.

10. The information transmission method of claim 8, further comprising:

generating, by the controller, a second compression parameter table according to current bandwidth of a control channel when the controller detects that bandwidth of the control channel of the gateway changes, wherein the second compression parameter table comprises at least one compression parameter supported by the controller, and wherein the second compression parameter table further indicates a priority of each compression parameter supported by the controller;

sending, by the controller, the second compression parameter table to the gateway to enable the gateway to determine a second compression parameter according to the second compression parameter table;

receiving, by the controller, the second compression parameter from the gateway; and processing, by the controller according to the second compression parameter, information to be transmitted to the gateway.

11. The information transmission method of claim 10, wherein before sending the second compression parameter table to the gateway, the information transmission method further comprises:

sending, by the controller, dynamic compression capability indication information to the gateway, wherein the dynamic compression capability indication information indicates that the controller supports a dynamic compression rule, and wherein the dynamic compression rule comprises a dynamic compression rule of determining the second compression parameter table according to a change of the bandwidth of the control channel of the gateway;

receiving, by the controller, a capability response message from the gateway; and determining, by the controller according to the capability response message, that the gateway supports the dynamic compression rule, wherein the capability response message indicates whether the gateway supports the dynamic compression rule.

12. A gateway, comprising:

a memory comprising instructions; and a processor coupled to the memory, wherein the instructions cause the processor to be configured to:

determine a current operating status and a current transmission port of the gateway, wherein the current transmission port is located between the gateway and a controller;

determine a first compression parameter table according to the current operating status and the current transmission port, wherein the first compression parameter table comprises at least one compression parameter determined by the gateway, and wherein the first compression parameter table further indicates a priority of each compression parameter; and transmit information to the controller according to the first compression parameter table using the current transmission port.

13. The gateway of claim 12, wherein the instructions further cause the processor to be configured to:

send the first compression parameter table to the controller;

receive a response message from the controller, wherein the response message carries a first compression parameter determined by the controller according to the first compression parameter table;

process to-be-transmitted information according to the first compression parameter; and send the processed to-be-transmitted information to the controller.

14. The gateway of claim 12, wherein the instructions further cause the processor to be configured to:

determine a compression parameter of the gateway in an initial operating phase and a compression parameter table of another transmission port of the gateway when the current operating status comprises a normal operating state, wherein the other transmission port comprises a transmission port other than the current transmission port in transmission ports of the gateway; and determine the first compression parameter table according to the compression parameter of the gateway in the initial operating phase and the compression parameter table of the other transmission port, wherein the first compression parameter table is different from the compression parameter table of the other transmission port, and wherein the first compression parameter table does not comprise the compression parameter of the gateway in the initial operating phase.

15. The gateway of claim 12, wherein when N transmission ports are currently configured for the gateway and the N comprises an integer greater than or equal to two, the instructions further cause the processor to be configured to:

switch the N transmission ports to M transmission ports, wherein the M comprises an integer greater than or equal to two; and determine M compression parameter tables for the M transmission ports, wherein all the M compression parameter tables are different from N compression parameter tables of the N transmission ports.

16. The gateway of claim 13, wherein the first compression parameter comprises:

a compression parameter in the first compression parameter table and supported by the controller; or a compression parameter supported by the controller and not comprised in the first compression parameter table.

17. The gateway of claim 12, wherein the instructions further cause the processor to be configured to:

receive a second compression parameter table from the controller, wherein the second compression parameter table comprises at least one compression parameter supported by the controller, and wherein the second compression parameter table further indicates a priority of each compression parameter supported by the controller;

determine a second compression parameter according to the second compression parameter table; and send the second compression parameter to the controller to enable the controller to process, according to the second compression parameter, information to be transmitted to the gateway.

18. The gateway of claim 17, wherein the instructions further cause the processor to be configured to:

sequentially determine, in descending order of priorities of compression parameters comprised in the second compression parameter table, whether the gateway supports the compression parameters comprised in the second compression parameter table until a compression parameter supported by the gateway is determined; and determine the compression parameter supported by the gateway as the second compression parameter.

19. A controller, comprising:

a memory comprising instructions; and a processor coupled to the memory, wherein the instructions cause the processor to be configured to:

receive a first compression parameter table from a gateway, wherein the first compression parameter table is determined by the gateway according to a current operating status of the gateway and a current transmission port of the gateway, wherein the first compression parameter table comprises at least one compression parameter, and wherein the first compression parameter table further indicates a priority of each compression para meter;

determine a first compression parameter according to the first compression parameter table; and send a response message to the gateway to enable the gateway to process to-be-transmitted information according to the first compression parameter, wherein the response message carries the first compression parameter, and wherein the to-be-transmitted information comprises information to be transmitted to the controller by the gateway.

20. The controller of claim 19, wherein the instructions further cause the processor to be configured to:

sequentially determine, in descending order of a priority of the at least one compression parameter, whether the controller supports the at least one compression parameter until a compression parameter supported by the controller is determined; and determine the determined compression parameter supported by the controller as the first compression parameter.

* * * * *

UNITED STATES PATENT AND TRADEMARK OFFICE
CERTIFICATE OF CORRECTION

PATENT NO. : 10,645,184 B2
APPLICATION NO. : 16/110604
DATED : May 5, 2020
INVENTOR(S) : Fei Li

Page 1 of 1

It is certified that error appears in the above-identified patent and that said Letters Patent is hereby corrected as shown below:

In the Claims

Claim 4, Column 24, Line 52: "NI compression parameter" should read "M compression parameter"

Signed and Sealed this
Thirtieth Day of June, 2020

Andrei Iancu
*Director of the United States Patent and Trademark Office*